United States Patent

Yeom

Patent Number: 5,911,080
Date of Patent: Jun. 8, 1999

[54] COMPUTER SYSTEM WHOSE POWER SUPPLY IS CONTROLLED BY AN IDENTIFICATION CARD AND A METHOD OF SUPPLYING POWER TO THE COMPUTER SYSTEM

[75] Inventor: Yun-pil Yeom, Seoul, Rep. of Korea

[73] Assignee: Samsung Electronics Co., Ltd., Kyungki-Do, Rep. of Korea

[21] Appl. No.: 08/970,497

[22] Filed: Nov. 14, 1997

Related U.S. Application Data

[63] Continuation-in-part of application No. 08/534,164, Sep. 26, 1995, abandoned.

Foreign Application Priority Data

Nov. 30, 1994 [KR] Rep. of Korea ...................... 94-32147

[51] Int. Cl.$^6$ ...................................................... G06F 1/26
[52] U.S. Cl. ...................... 395/750.01; 395/186; 380/25
[58] Field of Search .............................. 380/25; 395/186, 395/187.01, 188.01, 750.01

[56] References Cited

U.S. PATENT DOCUMENTS

| | | | |
|---|---|---|---|
| 3,984,658 | 10/1976 | Cannon | 235/382 |
| 4,240,516 | 12/1980 | Henderson et al. | 180/289 |
| 4,624,578 | 11/1986 | Green | 368/10 |
| 4,951,249 | 8/1990 | McClung et al. | 380/4 |
| 5,060,079 | 10/1991 | Rufus-Isaacs | 348/1 |
| 5,202,921 | 4/1993 | Herzberg et al. | 380/23 |
| 5,286,954 | 2/1994 | Sato et al. | 235/379 |
| 5,327,497 | 7/1994 | Mooney et al. | 380/25 |
| 5,553,296 | 9/1996 | Forrest et al. | 395/750 |
| 5,579,524 | 11/1996 | Kikinis | 395/750 |

*Primary Examiner*—Ayaz R. Sheikh
*Assistant Examiner*—David A. Wiley
*Attorney, Agent, or Firm*—Pillsbury Madison & Sutro LLP

[57] ABSTRACT

An ID card-controlled system drive having reduced power consumption includes an ID card in which a fixed user ID is stored, an ID card reader for outputting an appropriate signal by reading data stored in the ID card, a power supply control section for outputting an operation signal to permit a user to use the system drive after comparing the data from the ID card with the stored data and determining that the data corresponds, an auxiliary power-supply for providing power to operate the ID card reader and the power supply control section, and a main power supply for supplying the driving power source to operate system, which is variable according to the driving signals output from the power supply control section. Using this ID card-controlled system can reduce power consumption for reading the ID card, keep important information secret, and supply main power to the system only when the ID card coincides with a registered user ID.

10 Claims, 3 Drawing Sheets

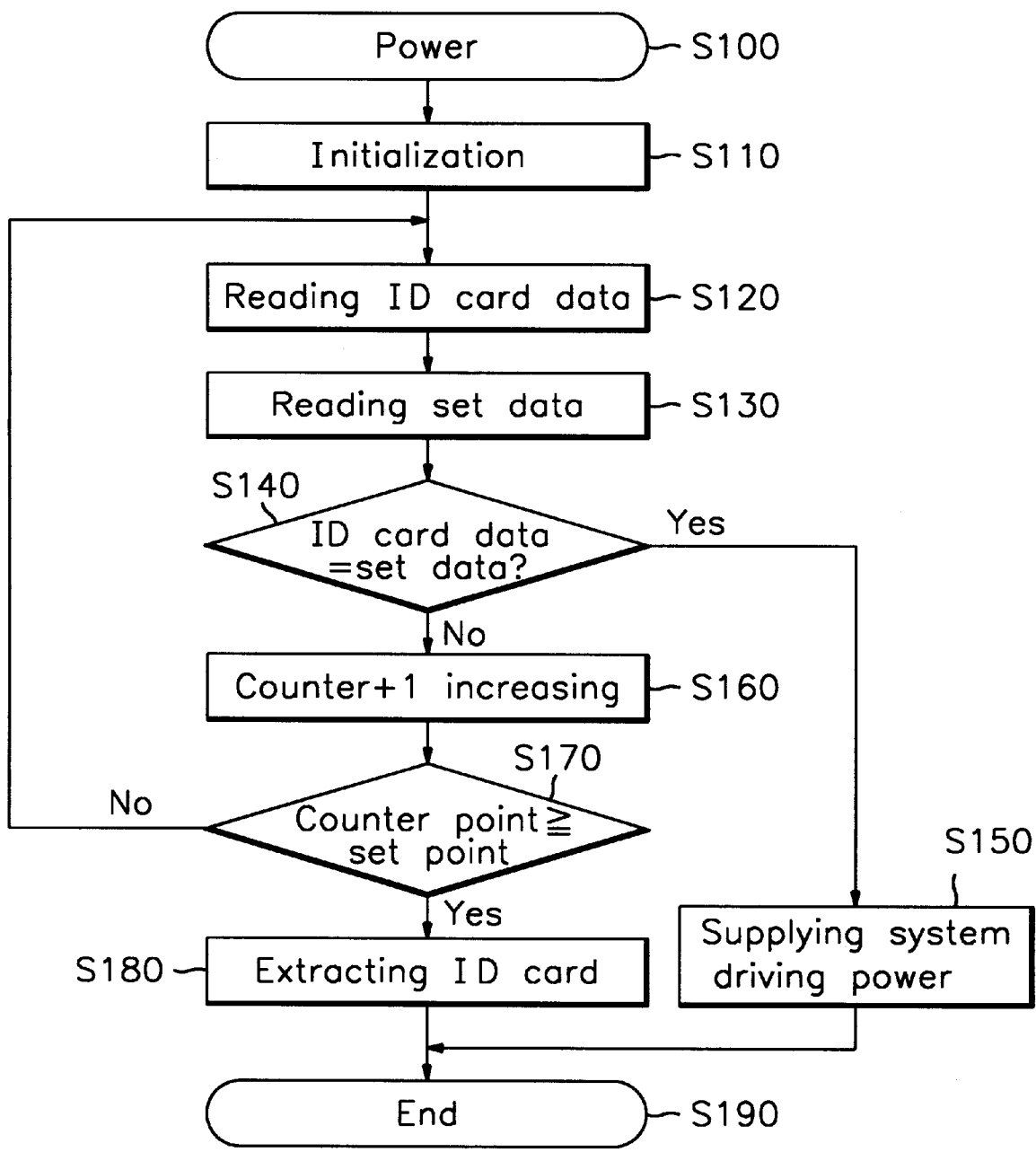

COMPUTER SYSTEM WHOSE POWER SUPPLY IS CONTROLLED BY AN IDENTIFICATION CARD AND A METHOD OF SUPPLYING POWER TO THE COMPUTER SYSTEM

This is a continuation-in-part (CIP) of application Ser. No. 08/534,164, filed on Sep. 26, 1995, which was abandoned upon the filing hereof.

BACKGROUND OF THE INVENTION (1) Field of the Invention

The present invention relates to an apparatus and method for operating a system drive using an identification (ID) card. Particularly, this invention makes use of a registered ID card for protecting the information of the system and reduces power consumption through controlling a power on/off condition of the system.

(2) Description of the Prior Art

In connection with FIGS. 1 and 2 of the drawings annexed hereto, there is described below a prior art apparatus and methods using the system drive in the context of a computer.

FIG. 1 is a perspective view of a conventional drive.

As illustrated in FIG. 1, the power supplying operation in the prior art is performed in such a way that AC power is supplied to an SMPS (Switching Mode Power Supply) 2 through a power plug 1. At this time, if a user presses a power switch 5, the power having been supplied to SMPS 2 is supplied to the main board 6, Floppy Disk Drive (FDD) 40, and Hard Disk Drive (HDD) 50 through cables 3, 4, 31, 32, and then operates the system.

However, the present state of this art suffers from some drawbacks:

With one kind of computer system that has been used so far, whoever wants to use that system, can use the system freely just by switching on the system. As a result, keeping secret important information stored in or accessible via the system becomes very difficult.

In order to solve this problem, in another kind of prior art system, drives are equipped with an apparatus to control a power on/off condition of the system with a registered ID card, to protect information.

FIG. 2 is a block diagram of the second type of prior art system drive the one controlled with an ID card.

As illustrated in FIG. 2, the prior art system drive controlled with an ID card includes:

an ID card 10, which has a password;

an ID card reader 20, which reads the password of the ID card 10;

a keypad 60, which outputs several key signals;

an operation control section 30, which outputs control signals to control all sorts of operations connected to an output terminal of the keypad 60;

a FDD (Floppy Disk Drive) 40, which operates a floppy disk in accordance with applied control signals and which is connected to an output terminal of the operation control section 30;

a HDD (Hard Disk Drive) 50, which operates a hard disk in accordance with applied control signals and which is connected to an output terminal of the operation control section 30; and a monitor 70, which displays data in accordance with the applied control signals and which is connected to output terminal of the operation control section 30.

The functions of the prior art system drive controlled with an ID card will now be described.

After power is applied to the system, the operation control section 30 determines if an ID card 10 is inserted. If an ID card is inserted, it determines whether a password is input from the keypad 60. Then a user inputs an appropriate password by operating the keypad 60, and the operation control section 30 transfers that input password to an ID card reader 20. If the ID card reader 20 outputs an appropriate signal to output the password from the operation control section 30, the ID card 10 determines whether the stored password is consistent with a password transferred from the operation control section 30, and outputs the error code to the ID card reader 20 in case both passwords do not coincide with each other. Once an error code is output from the ID card reader, the operation control section 30 displays the occurrence of error (i.e., non-correspondence) on monitor 70 and stops the system. In the above description, once the ID card 10 outputs a specific signal to the ID card reader 20, if the stored password does correspond with that from the operation control section 30, the ID card reader 20 changes the signal to the eligible signal for the operation control section 30 and outputs it to the operation control section 30. After the operation control section 30 reads the booting areas of the FDD 40, the HDD 50, by determining if DOS exists or not, reads a user ID stored in the ID card and a user ID data base stored in the HDD 50 and determines if the appropriate user ID is registered in the PC. In this case, if the user ID is registered, the control section permits the user to use the computer; if the user is not registered, the control section stops the user from using the computer.

The system drive using the ID card may prohibit transmittal of important information through the way of giving the password. In case it can not read that password, it does not allow the use of the system. However, as it reads the ID card only under the power-on state of the whole system, the power consumption for reading the ID card is increased, and, it may have the same disadvantage in regard to power consumption as the computer which has no ID card reader.

SUMMARY OF THE INVENTION

Therefore, the main object of this invention is to solve the problems in prior art and to provide an apparatus and method of system drive controlled with an ID card, while reducing power consumption for ID card reading. The apparatus which controls the power on/off of the system with ID card control performs the ID card reading process by equipping the system with an auxiliary power section for reading an ID card and supplies main power to the system only if the ID card and the registered user ID correspond to each other. And the system can be operated thereafter.

The apparatus of the system drive with ID card control to fulfill these objects includes:

an ID card 10, which has a password;

an ID card-reader for outputting an appropriate signal by reading data stored in the ID card;

a power-supply control section for outputting an operation signal to determine the usability of the data stored in the ID card and the data after comparing and determining the set data in case that the data stored in the ID card coincides with the set data;

an auxiliary power-supply for operation of the ID card reader and the power supply control section; and, a main power supply for supplying the driving power source to operate the system, which is variable according to the driving signals output from the power supply control section.

Another embodiment of the method includes:

initializing each of a plurality of using variables and reading the data stored in an inserted ID card when power is applied;

reading the data stored in memories to determine the usability of the inserted ID card;

determining the relation between the data stored in the inserted ID card and a given set of data; and operating signals to drive the system only if the data stored in the inserted ID card corresponds to the given set of data.

BRIEF DESCRIPTION OF THE DRAWINGS

FIG. 5 is an operational flowchart of an ID card-controlled system drive in accordance with a preferred embodiment of this invention.

DETAILED DESCRIPTION OF THE PREFERRED EMBODIMENTS

An embodiment of the invention is described below in further detail with reference to the drawings.

Figure 1:
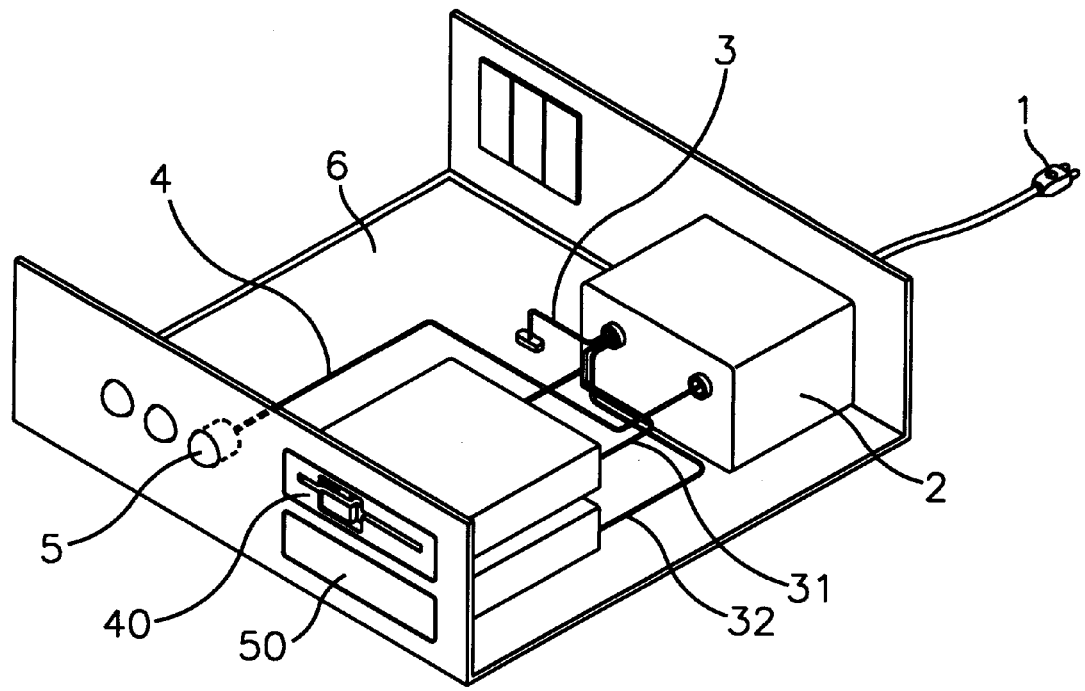
FIG. 1 is a perspective view of a first system drive of prior art.
Figure 2:
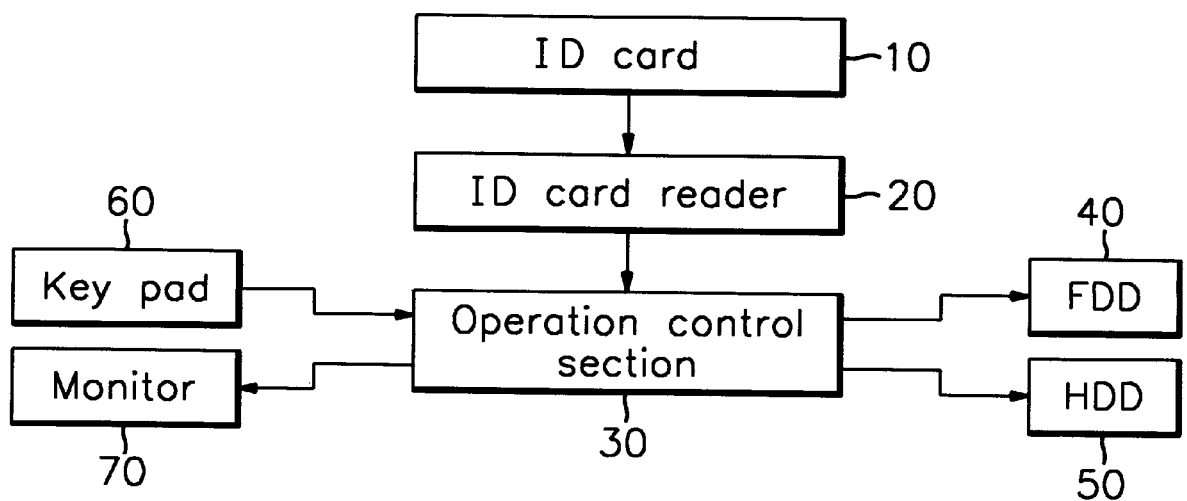
FIG. 2 is a block diagram of a second prior art system drive, having an ID card control.
Figure 3:
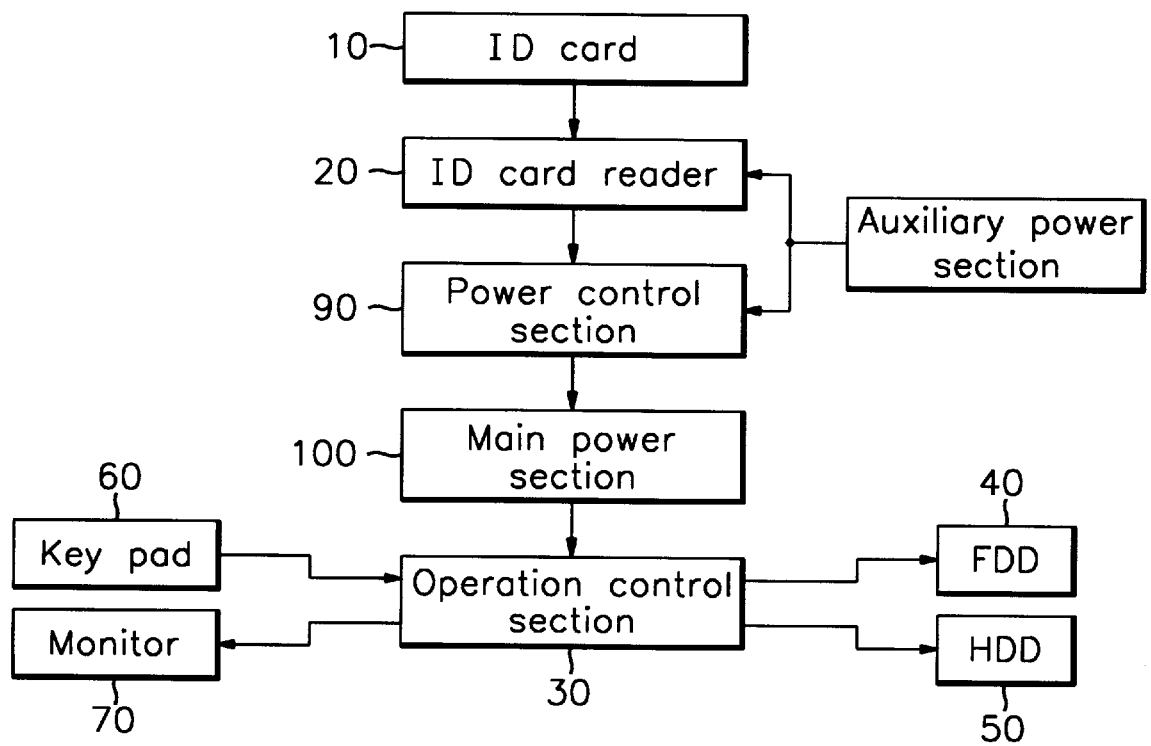
FIG. 3 is a block diagram of the system drive having an the ID card control in accordance with a preferred embodiment of the present invention.
Figure 4:
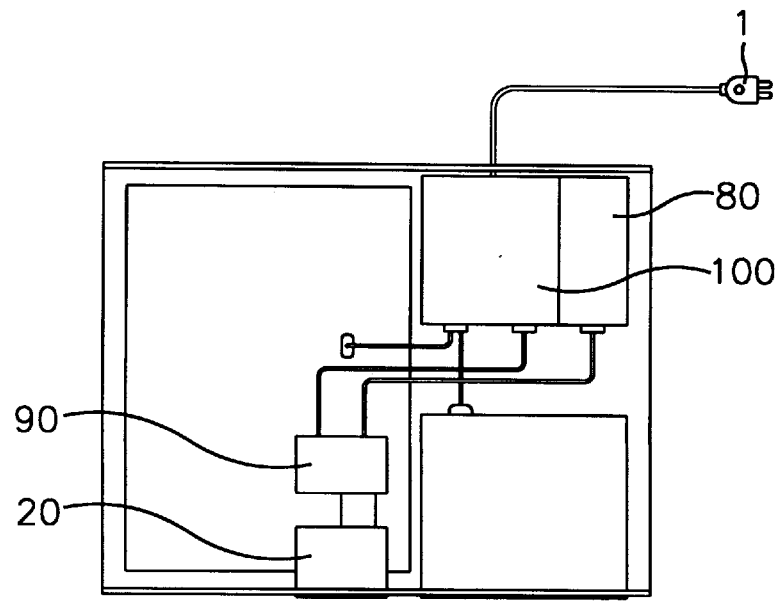
FIG. 4 is a plan view of an ID card-controller system drive in accordance with a preferred embodiment of the present invention.

As illustrated in FIG. 3 and FIG. 4, an apparatus and method ID card-controlled of system drive in accordance with a preferred embodiment of this invention includes:

an ID card 10, which has a password;

an ID card reader 20, which reads the password of the ID card 10;

a keypad 60, which outputs several key signals;

a power control section 90, which outputs the power supplying signal after comparing the information read by the ID card reader 20;

an auxiliary power supply 80, which supplies the driving power source of the power control section 90 and the ID card reader 20;

a main power supply, which supplies the system driving power source connected to an output terminal of the power control section 90;

an operation control section 30, which outputs control signals to control operation of the PC driven in accordance with an applied power source, and which is connected to an output terminal of the main power supply 100;

a FDD (Floppy Disk Drive) 40, which operates a floppy disk in accordance with the applied control signals, and which is connected to an output-terminal of the operation control section 30;

a HDD (Hard Disk Drive) 50, which operates a hard disk in accordance with the applied control signals, and which is connected to an output terminal of the operation control section 30, wherein the operation control section 30, a FDD 40, a HDD50 form a main system; and a monitor 70, which displays data in accordance with the applied control signals, and which is connected to an output terminal of the operation control section 30.

Operation of the apparatus and method of the ID card-controlled system drive in accordance with a preferred embodiment of this invention is described below.

If a user inserts an ID card into an ID card reader 20 to run the system, the power of an auxiliary power supply 80 is supplied to the ID card reader 20 and power control section 90. As illustrated in FIG. 4, the ID card reader 20 and the power control section 90 are mounted in the computer system. Once the power of the auxiliary power supply 80 is supplied to the power control section 90, the power control section 90 initializes all using variables S110 and reads the corresponding information to user ID S120 stored in the inserted ID card from the ID card reader 20. The ID card reader 20, if the power is supplied from the auxiliary power supply 80, reads user ID stored in the inserted ID card and outputs an signal to the power control section 90. After power control section 90 reads the user ID stored in the inserted ID card, it compares the user ID with the data stored in the power control section 90 and determines whether to allow the user to use that system S130–140. If the user ID corresponding to the inserted ID card corresponds to an allowed data stored in (not illustrated) memories of the power control section 90, it outputs the driving signal S150 to the main power supply 100 to drive the system. The main power supply 100, if the driving signal is applied from the power control section 90, supplies power to the operation control section 30 and the peripheral devices to drive the system. The power control section 90, if the user ID corresponding to the inserted ID card does not correspond to permitted-to-use data stored in (not illustrated) memories of the power control section 90, increases the set value for a fixed point S160 and determines the relation between the increasing set counter values and the set value for extracting the ID card S170. If the set counter value is below the set value to extract the ID card, the power control section 90 reads the data of ID card inserted through the Id card reader 20 and repeats the above step; if the set counter value is above the set value to extract the ID card, it extracts the inserted ID card by operating an ID card extracting device S180. After either of steps S150 or S180, the power to the ID card reader 20 and the power control section 90 is turned off after a predetermined time interval S190. The predetermined time interval can be set, for example, to last 1–2 seconds. Therefore, after the power control section 90 produces a signal for extracting the ID card S180 or a signal for supplying system driving power S150, it becomes unnecessary to supply power to the ID card reader 20 and the power control section 90. Thus, the power control section 90 produces another signal to turn off the auxiliary power supply 80 to thereby stop the auxiliary power supply 80 from supplying power.

In this preferred embodiment of this invention, by supplying power for reading the ID card and for driving the system, one can inhibit power consumption with the whole system driving while reading ID card. In addition, by allowing the driving of the system according to the use of ID card, one can provide the apparatus and method of the system drive with ID card having the effects of the common use of several systems and of keeping important information secret.

What is claimed is:

1. An ID card-controlled system, comprising:
    an ID card reader for outputting a signal by reading data stored in an ID card;
    power-supply control section means for outputting an operation signal to allow an user to use a system controlled by the ID card, only after comparing and determining that an user ID stored in the ID card corresponds to reference data;

an auxiliary power-supply for providing power to operate said ID card reader and said power-supply control section means; and a main power supply for supplying driving power to operate the system except the ID card reader and the power supply control section means; said driving power being variable according to the operation signal output from said power supply control section means;

wherein the power-supply control switch means directly controls the main power supply without using any device in the system.

2. The ID card-controlled system drive of claim 1, wherein:

said power supply control section means is arranged to increase a counter value if the data stored in the ID card inserted in said ID card-reader does not correspond with said reference data, after which, if the counter value is above a value to extract said ID card, said power supply control section outputs the signals to extract the ID card, and if the counter value is below the value to extract said ID card, said power supply control section reads data stored in the ID card and outputs said signals.

3. An ID card-controlled system, comprising:

an ID card reader adapted and constructed to read data stored in an ID card and output a first signal;

a power-supply control adapted and constructed to receive said first signal and to output a second signal;

an auxiliary power-supply adapted and constructed to provide power to operate said ID card reader and said power-supply control; and a main power supply adapted and constructed to receive said second signal and to provide driving power to operate said system, except the ID card reader and the power supply control, such that said main power supply only provides said driving power upon receipt of said second signal;

wherein said second signal is only generated after comparing said data read from said ID card with internal data, and after determining that said data read from said ID card corresponds with said internal data; and the power-supply control directly controls the main power supply without using any device in the system.

4. A computer system whose power supply is controlled by an identification card, the computer system comprising:

an ID card reader, being mounted in the computer system, for outputting an ID signal by reading data stored in an ID card;

power supply control section means, being mounted in the computer system, for receiving the ID signal and for outputting an operation signal if the ID signal correspond to reference data memorized in the power supply control section means;

an auxiliary power supply for providing power to operate the ID card reader and the power supply control section means;

a main system to be used by an user when the ID signal correspond to the reference data; and a main power supply for supplying driving power to operate the main system upon receiving the operation signal.

5. A computer system as claimed in claim 4, wherein:

the power supply control section means is arranged to increase a counter value if the data stored if the ID card inserted in the ID card reader does not correspond to said reference data, after which, if the counter value is above a value to extract said ID card, said power supply control section means outputs signals to extract the ID card, and if the counter value is below the value to extract said ID card, said power control section means needs data stored in the ID card and outputs said signals.

6. A computer system as claimed in claim 4, wherein the power supply control section means outputs a shutdown signal to turn off the power auxiliary power supply.

7. A computer system as claimed in claim 4, wherein the ID card reader and the power supply control section means directly control the main power supply without using any device of the main system.

8. A method of supplying power to a computer system, the method comprising the steps of:

supplying an auxiliary power to an ID card reader and a power supply control section means;

reading data in an ID card inserted in the ID card reader;

determining whether the data in the ID card corresponds with reference data memorized in the power supply control section means; and outputting an operation signal for supplying driving power to a main system to be used by a user if the data in the ID card corresponds with reference data.

9. A method of supplying power to a computer system as claimed in claim 8, wherein the auxiliary power is turned off after a predetermined time interval.

10. The method of supplying power to a computer system as claimed in claim 8, wherein the operation signal for supplying driving power to the main system is determined without using any device in the main system.

\* \* \* \* \*